Figure 1A:
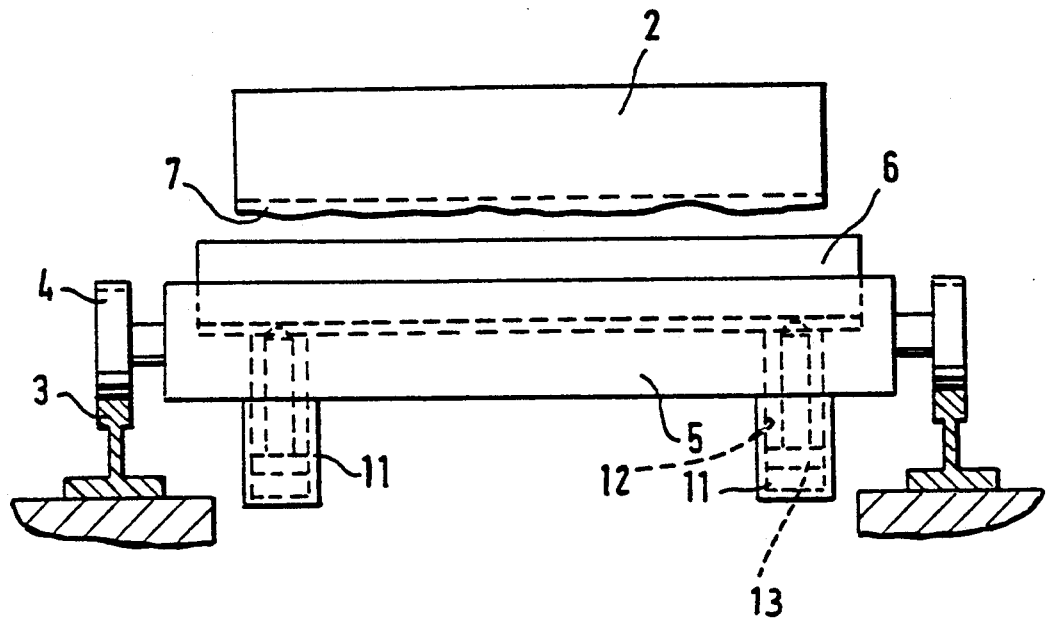

United States Patent [19]

Lotz et al.

[11] Patent Number: 5,259,440
[45] Date of Patent: Nov. 9, 1993

[54] STEEL CONTINUOUS CASTING INSTALLATION WITH MECHANICAL REMOVAL DEVICE FOR OXYGEN CUTTING BURRS

[75] Inventors: Tobias Lotz, Zürich, Switzerland; Guenter Thomma, Wiesbaden-Delkenheim, Fed. Rep. of Germany

[73] Assignee: Aute AG Gesellschaft fur Autogene Technik, Switzerland

[21] Appl. No.: 720,391

[22] Filed: Jun. 25, 1991

[30] Foreign Application Priority Data

Jun. 25, 1990 [EP] European Pat. Off. ......... 90112027.9

[51] Int. Cl.⁵ .............................................. B23D 13/00
[52] U.S. Cl. .................................... 164/263; 83/914; 409/298; 409/301; 409/297
[58] Field of Search .................. 164/263; 83/914; 409/297, 298, 301, 317, 338, 345

[56] References Cited

U.S. PATENT DOCUMENTS 3,780,552 12/1973 Staskiewicz et al. ............. 164/263
4,802,356 2/1989 Yamada et al. ................... 164/263

FOREIGN PATENT DOCUMENTS 0091855 10/1983 European Pat. Off. ............ 164/263
0154359 9/1982 Japan .................................. 164/263
2059839 4/1981 United Kingdom ............... 164/263

Primary Examiner—Mark Rosenbaum
Assistant Examiner—Erik R. Puknys
Attorney, Agent, or Firm—Gifford, Groh, Sprinkle, Patmore and Anderson

[57] ABSTRACT

In a steel casting installation with double-acting and fast-acting mechanical burr removal machine or unit for burn burrs which are produced when the continuous casting is cut up thermochemically, travalling or stationary burr removal machines or units are provided for stationary or moving bloom blocks or billets, wherein a shearing beam arranged stationarily or displaceably beneath the bloom in the horizontal plane inclinedly relative to the burr line carries a guided shearing bar which is resiliently adjustable in respect of height at both ends, in one piece or comprising individual, spring-mounted portions, possibly with front and rear cutting edges, for pressing against the burr line horizontally or inclinedly in the vertical plane.

3 Claims, 4 Drawing Sheets

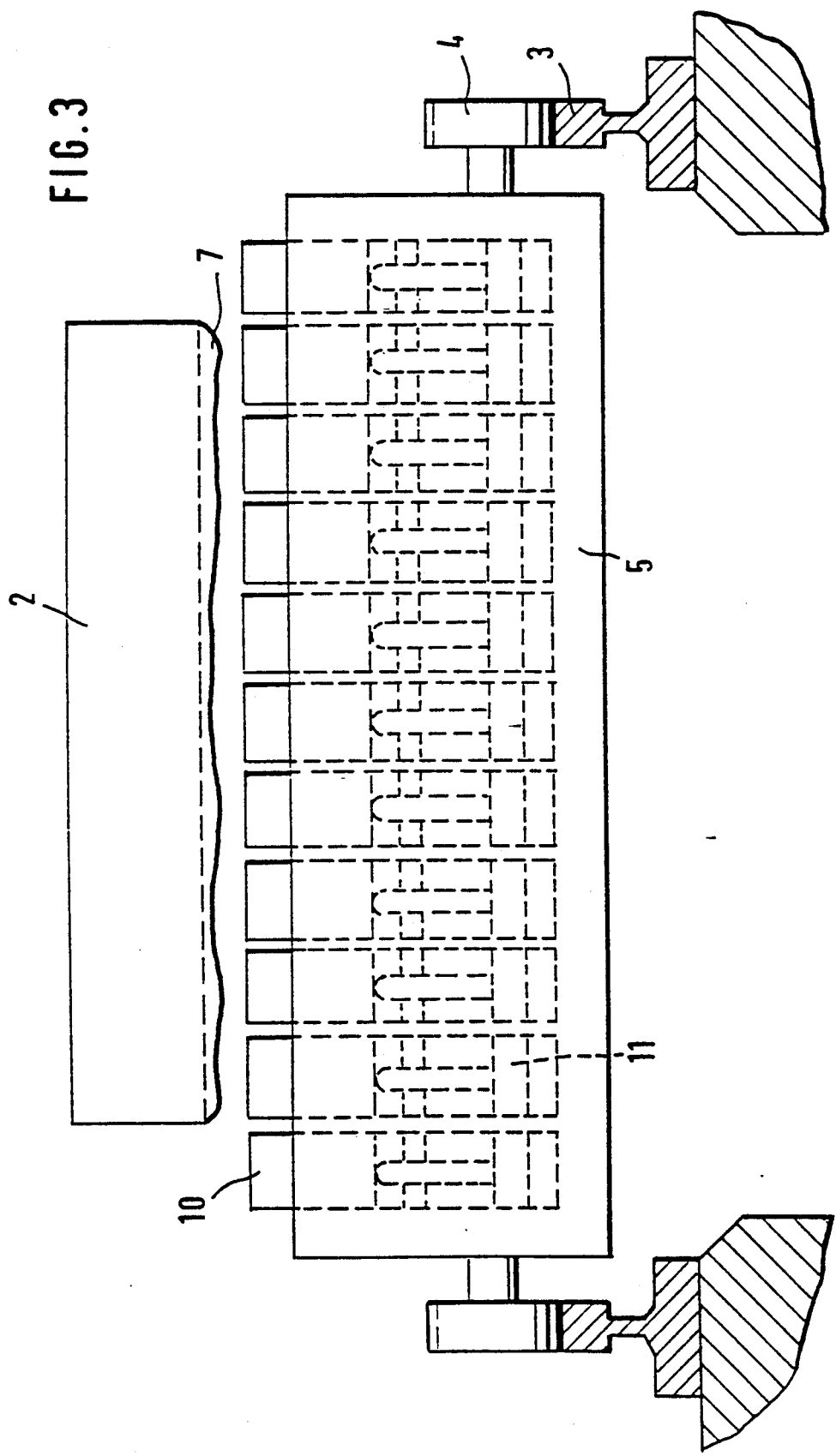

STEEL CONTINUOUS CASTING INSTALLATION WITH MECHANICAL REMOVAL DEVICE FOR OXYGEN CUTTING BURRS

The invention relates to a steel continuous casting installation with a double-acting and fast-acting mechanical burr removal machine or unit for burn burrs which are produced when the continuous casting is cut up thermochemically.

Steel continuous casting installations are known, which are provided with burr removal devices. Besides devices which operate using gases and which remove the burn burrs by melting them away, it is known in particular for the burrs to be removed mechanically by means of round blades or shearing beams. Depending on the location of installation, workpiece temperature, workpiece position, cross-sectional shape, quality of material, size of burr and the like, the burr removal operation is only incompletely performed.

The object of the present invention is therefore that of providing a steel continuous casting installation of the kind set forth in the opening part of this specification, in which removal of the burrs is possible shortly after the production thereof, in single, twin and triple positions, in the optimum fashion, on stationary and/or moving workpieces.

The invention provides that, in a steel continuous casting installation of the kind set forth above, a shearing beam arranged stationarily or displaceably under the bloom in the horizontal plane relative to the plane of the burr located on a lower surface of the continuous casting carries a shearing bar which is resiliently adjustable in respect of height at both ends, in one piece, possibly with front and rear cutting edges, for pressing against the burr line horizontally or inclinedly in the vertical plane.

In its advantageous configuration, the invention is characterized in that the shearing bar comprises any number of individually guided portions which are resiliently adjustable in respect of height, possibly with common front and rear cutting edges, which, being straight, curved, wavy or composed of a plurality of other geometrical shapes, forms a line or double line, preferably comprising angular, round or laterally flattened round blocks which are individually guided in the shearing beam and which, for the purposes of adjustment and bearing against the bloom, can be raised and lowered in groups or individually and resiliently, preferably together with cover portions.

An advantagoous configuration further provides that the shearing beam has guides for adjustments in respect of height and for carrying the shearing forces, for the shearing bars, for portions of the shearing bar of any shape or for the shearing blocks, and the arrangement includes mounting means or fixing means for resilient and movable stroke drive means corresponding to the number of shearing bars or shearing blocks in the shearing beam.

In accordance with a further development the invention proposes that the mounting means or fixing means for the stroke drive means or resilient supports for the shearing blocks are themselves incorporated as essential components of the latter into the shearing beam in the form of cylindrical bores, corresponding to the number of portions and the configuration of the portions of the shearing bar, wherein the bores serve as spring pockets or as cylinders for pneumatic or hydraulic pistons with which the shearing bar portions or shearing blocks which are arranged in a row can be lifted, pressed against the burr line or lowered, and desirably all cylinders are provided with at least one or more feed and discharge flow bores in order to be supplied with or drained of actuating fluid from individual or common pressure and discharge flow lines.

A further embodiment of the shearing beam advantageously provides that the shearing beam has longitudinal bores or longitudinally extending ducts from which the cylinders are supplied with and drained of actuating fluid or which serve for blowing through for cleaning purposes or as monitoring or control line passages for sensors for determining or observing the positions of the individual shearing blocks or groups of shearing blocks.

A development of the present invention provides that the shearing beam belongs to a carriage system which is moved by motor means or hydraulically, for the purposes of adjustment or for removing burrs by a shearing effect, wherein the carriage system can be stopped for removing burrs, when dealing with a moving bloom.

There is further advantageously provided a control for the system for displacement and adjustment in respect of height, which provides for the sequence of upward movement, pressing against the burr line, displacement for shearing purposes, jumping up and downward movement, displacement into the starting position behind the second burr line, individually or in a group-wise manner for the shearing bar, shearing bar portions or shearing blocks, in succession, in such a way that the spacing between two burr lines on two adjacent blooms is only slightly wider than the width of a shearing bar portion or shearing block.

A development of the invention concerning the stroke drive means provides that the stroke drive means which produce the adjustment in respect of height of the shearing bar, shearing bar portions or shearing blocks can operate with more than one stroke-producing element for and vigorous pressing against the burr line, and in the highest position can be switched over or automatically switched over to downward movement and remaining in a downward position, for example by a stroke drive means which moves the shearing bar upwardly without encountering a resistance from the bloom and permitting a transfer of medium from the stroke drive means which is already entirely upwardly, the stroke driving means being pressed downwardly.

In order to satisfy the corresponding operating requirements, it may be provided that the burr removal machine or device is disposed in one or more portions one behind the other or one beside the other, in a stationary and movable configuration or in a multiple arrangement.

Furthermore it is possible that the burr removal machine or device is arranged beside longitudinally divided blooms and, moving forwards, up, backwards and down in a roller gap transversely to the longitudinal axis of the bloom, removes a longitudinal burr portion before the bloom is advanced by a portion of its length, or can be moved in a portion-wise manner between the burr removal operations at or beneath the bloom which is fixedly supported with the burr side sticking out.

When machining a stationary bloom downstream of the moving casting, it is advantageously provided in accordance with the invention that the burr removal machine or device is arranged in one of the last gaps in a cutting or transportation roller bed or in the gap downstream of a cutting or transportation roller bed which also reciprocates, adjacent to the roller at the entry end, and strips off at a stationary location the rearward burr of a departing bloom and shears off the front burr of an incoming bloom by overtaking it from behind after it has passed thereover.

Figure 1B:
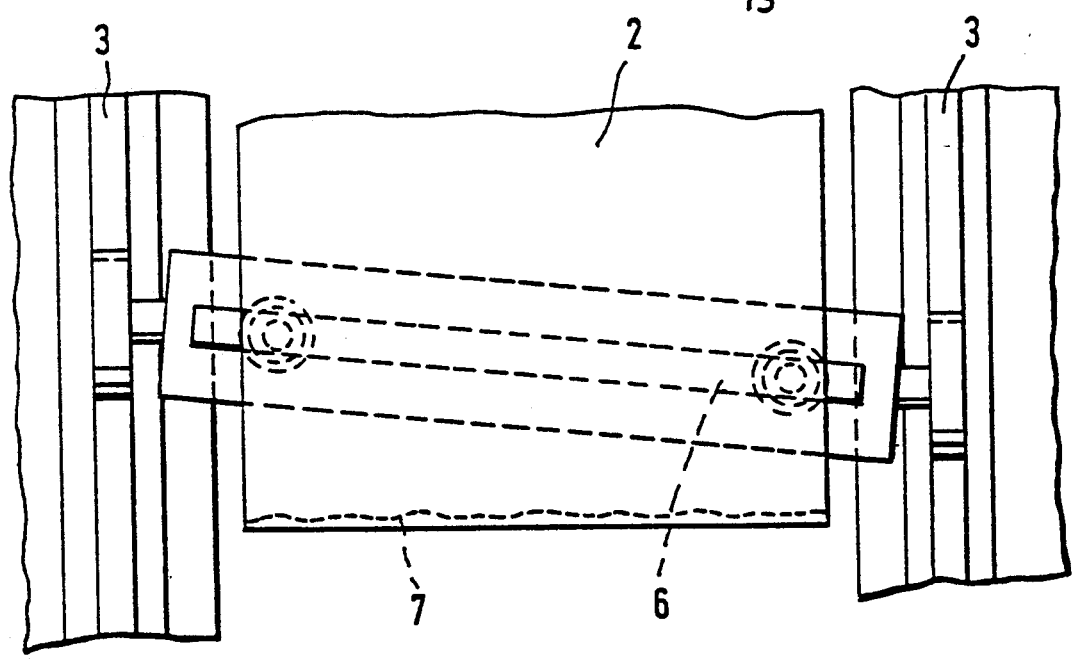
Figure 4A:
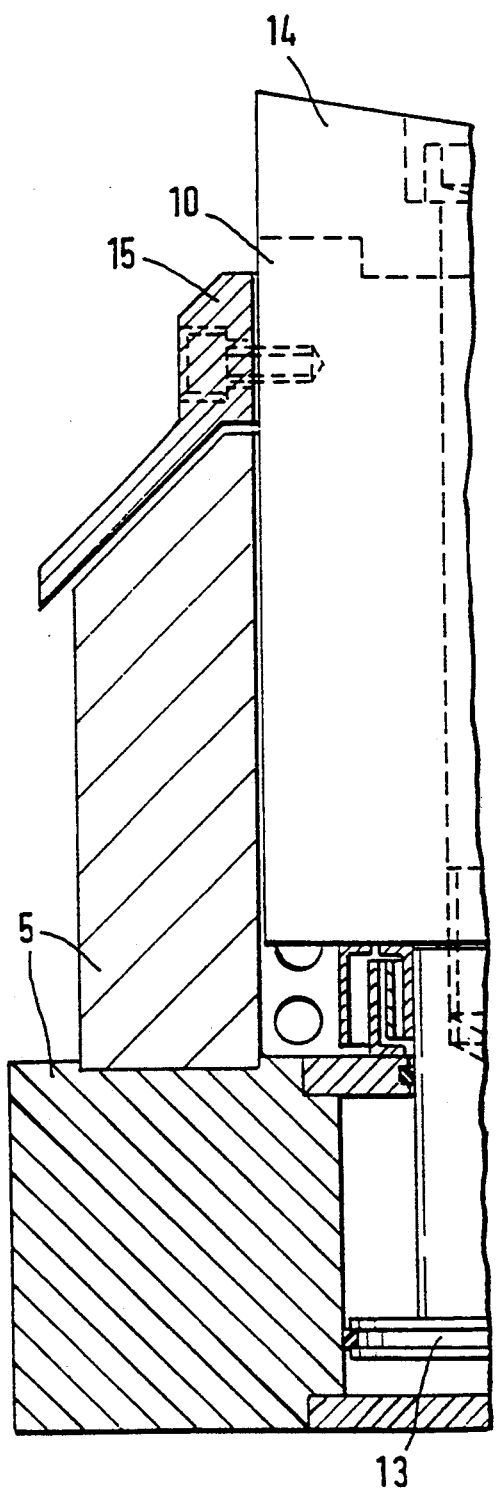
Figure 4B:
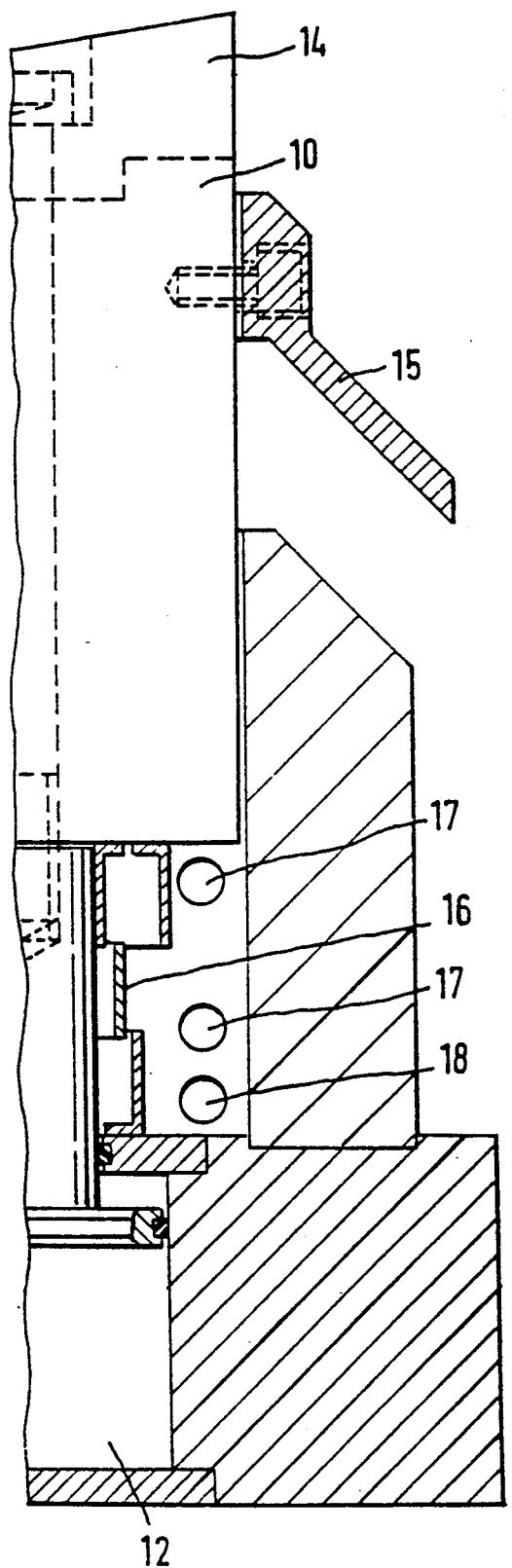

The invention will be described in greater detail hereinafter by means of an embodiment with reference to the accompanying drawings in which the same reference numerals in the various figures relate to the same components. In the drawings:

FIG. 1a is a front view of a continuous casting installation with a burr removal device, FIG. 1b is a plan view of the continuous casting installation shown in FIG. 1a, FIGS. 2a through 2g are diagrammatic views of the various options in regard to the shearing bar arrangement and configuration, FIG. 3 is a diagrammatic side view of a preferred embodiment, and FIGS. 4a–4b show the structural configuration of an element in the embodiment illustrated in FIG. 3.

Referring to FIG. 1a, shown therein is a bloom 2 after having been separated from the continuous casting. In passing into a burr removal position, the bloom 2 has encountered a bloom abutment (not shown) which is introduced from above and which thus fixes the position of the burn burr 7 which is to be found at the bottom cutting edge. A shearing bar 6 for removal of burrs 7 is thereafter lifted, pressed against the underneath surface of the bloom in the vicinity of the burr and moved towards the bloom abutment which does not project downwardly beyond the underneath surface. The shearing bar 6 progressively moves over the burr line 7 by virtue of its design configuration or inclined positioning. In that way it is possible for the shearing bar 6 to provide at any time for removal of a burr line which is curved inwardly or outwardly or which departs inclinedly from the horizontal, by virtue of the shearing bar being pressed resiliently and therefore also yieldingly against the burr line. It will be appreciated that the burr must also be removed at the end surface of the previously severed bloom 2 ($\times$ — 1). For that purpose that previous bloom can be moved back on the same transportation line into contact with the same bloom abutment as the bloom X which was just being considered above. In that way, the rear or trailing burr 7 can be removed perhaps at the same time as the front or leading burr 7 of a subsequent bloom, in the same transportation gap, with a second shearing bar. With a suitable apparatus configuration, the two burrs 7 in such a closely adjacent position could be successively removed by one shearing bar 6.

It is provided that the shearing bar is disposed under a bloom 2, for example X, is moved upwardly against same and, while being pressed thereagainst, removes the first burr 7 by displacement. The shearing blade or bar is then lowered, moved into a position beneath the other bloom 2, for example X — 1, set and again pressed upwardly in order then to shear off the second burr in the opposite direction. That operation can also be performed in the reverse sequence. A similar situation applies when the shearing bar 6 is stationary and the bloom 2 moves to produce the shearing effect, from same towards the end of the bloom. In that way, it is also possible for the burn burr 7 to be removed from workpieces which are disposed in side-by-side relationship, at the same abutment position, in one working operation, when using a shearing bar 6 which is naturally of suitable length.

Depending on the bloom weight and the upwardly directed shearing pressure, the end of the bloom may yield and a burn burr 7 which is perhaps flatter may slide over the shearingbar 6 without being sheared off. In order to prevent that from happening, the bloom 2 is subjected to a loading from above; that can be effected by moans of rollers (not shown) which are pressed against the bloom when dealing with blooms 2 which are moved for the burr removal operation, or by holddown means which are applied to the bloom 2, when dealing with blooms 2 which are stationary for the burr removal operation.

In a stationary configuration, that is to say with holddown rollers, a burr removal machine according to the present invention comprises a shearing beam 5 in which a shearing bar 6 is supported on both sides in the shearing bar guide arrangement on stroke-producing elements 11 which for example are in the form of hydraulic drive means with cylinders 12 and pistons 13. The stroke producing elements are capable of selectively elevating the shearing beam 6 at opposite ends thereof against the lower surface of the bloom. In the raised position beneath the underneath surface of the bloom 2, depending on the respective curvature or sag of the bloom 2, one is moved upwardly to a limited extent into a position beneath the angle of the underneath surface of the bloom (support bearing side) while the other is moved upwardly to a limited extent above the angle of the underneath surface, with perhaps a somewhat smaller lifting force, depending on the curvature or crown effect of the bloom 2, but can also be pushed back by the bloom itself in the transitional position in respect of the burr line (thrust bearing side). The above-mentioned limitations can be provided by fixing the stroke travel movement when designing the items of equipment, by limiting the amount of hydraulic fluid or by virtue of mechanical stops, for example a stop ring on the piston rod or the like. The shearing beam 5 may be arranged at a displaced position in the longitudinal axial direction of the bloom so that, in relation to the burr 7, it is disposed at an angle of between 0° and 60°, perhaps about 5°, such angle being governed by the conditions in respect of space, the chip length of the sheared-off burr 7, the design configuration of the shearing bar 6 and the shearing force required.

In order to compensate for different heights at the front and rear edges of the shearing bar 6 when using an inclined position relative to the burr line 7, the shearing bar 6 or the shearing beam 5 may be rotatable in bearings about its own longitudinal axis, as diagrammatically shown in FIG. 2a. Referring further to FIG. 1b, travel of the shearing bar 6 is provided by the end portions of the shearing bar 6 which are slidably mounted within a pair of parallel channels 3 of a travelling system on opposite sides of the continuous casting. As is further clearly shown in FIG. 1b, the shearing bar may be tilted about an axis perpendicular to the lower surface of the casting to assist in removing the burr. In that way the surface of the shearing bar 6 always bears flat against the cutting edge of the bloom. As the slightly angular positioning produced by rotary movement of the shearing beam occurs at the lower surface of the bloom, the operation of shearing off of the burr begins, which results in a stripping-off shearing action which removes the burr 7.

The shearing beam 5 is an extra-deep, stiff beam construction for receiving one or more interchangeable shearing bar portions 9 which are used as a common shearing bar 6 possibly on both sides for the front and rear burrs 7 on a bloom 2.

So that the entire shearing force does not have to be applied in regard to a burr to be sheared off, the shearing bar 6 is in a position which is angled relative to the edge of the bloom 2 and thus relative to the configuration of the burr 7, as shown in FIG. 1b and FIG. 2g.

As the bloom may be of an irregular surface configuration, in that in particular the surface is curved, a continuous shearing bar 6 gives rise to difficulties because the corresponding burr 7 also does not extend in one plane. Depending on the deviations to be expected therefore the shearing bar 6 may be more or less divided up, as shown in FIGS. 2b through 2e. Suitably dividing up the shearing bar 6 into shearing bar portions 9 makes it possible to adapt it to the bloom and thus provide for optimum removal of a burr 7 of irregular configuration.

When the machine is of a movable configuration, the burr removal machine for oxygen cutting burrs according to the present invention, with for example a combined bloom abutment arrangement/hold-down means, comprises a shearing beam 5 which is displaceable or adjustable with a shearing force and in which are disposed stroke-producing elements 11 which lift the shearing bar on both sides more or less to the ideal position of the underneath surface of the bloom and press it thereagainst. Referring to FIG. 2b, the shearing bar 6 and the portions 9 thereof are rotatably mounted on the stroke-producing elements 11 in order to permit inclined positioning of the shearing bar 6 when performing a rotary shearing operation or for successively passing over the burr line. For the shearing beam 5, the arrangement has rollers or sliding systems with drive means of preferably hydraulic nature, which permit adjusting displacement or shearing displacement.

If the shearing bar is of a one-piece configuration, it may be curved over its length at its surface in order to provide for better shearing tracing along a burr line 7; it is also possible that, for example when used only on one side, because of the geometry involved, with an inclined shearing bar 6 relative to the burr line 7, the front or leading edge of the shearing bar 6 may be higher than the rear or trailing edge, so that the shearing bar cross-section is no longer square or rectangular but only quadrangular with different corner angles.

Figure 2:
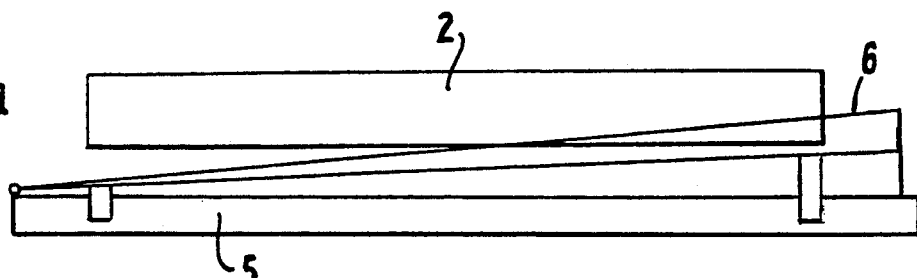
Figure 2:
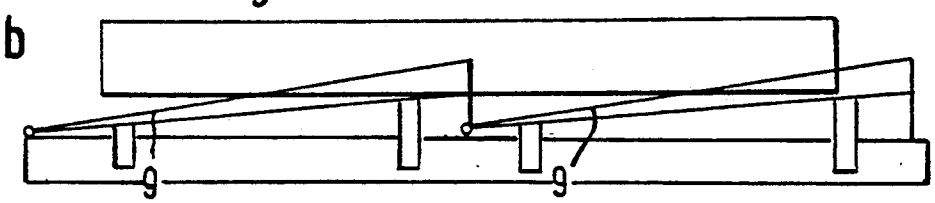
Figure 2:
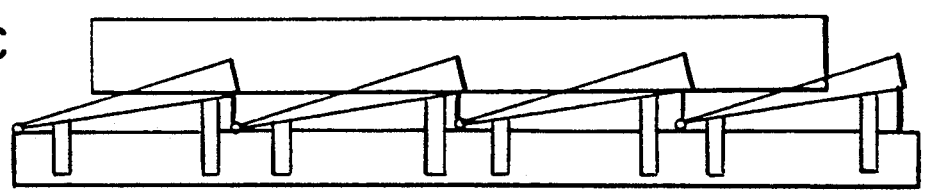
Figure 2:
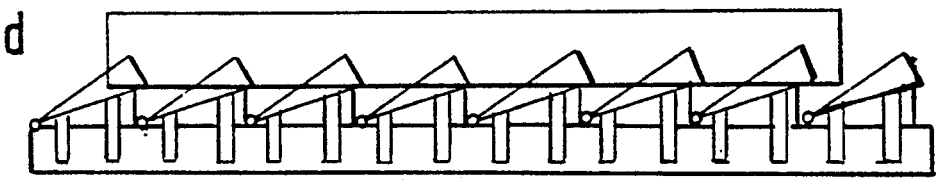
Figure 2:
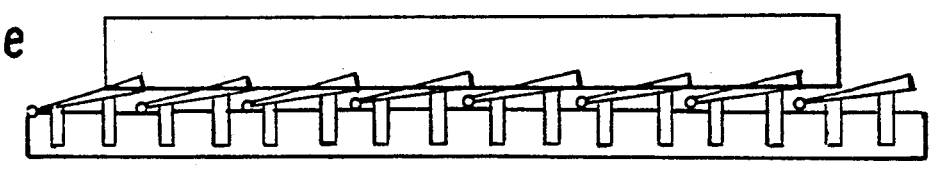
Figure 2:
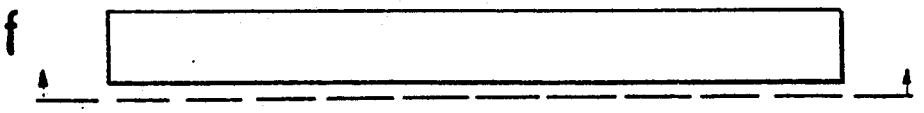
Figure 2:
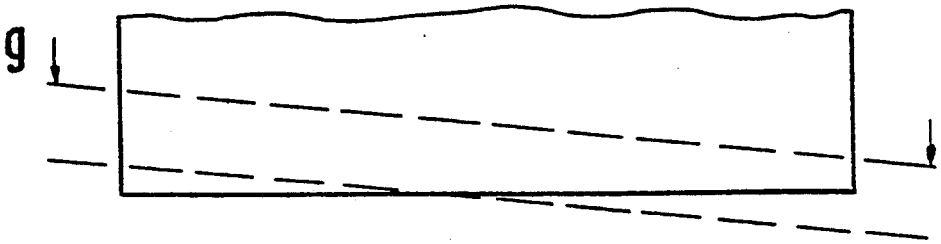

As, when transiting the burr line 7, in the region of the predominantly stationary stroke-producing element 11, the shearing bar 6 must then be pressed to a particularly high position on the other side, in particular when dealing with very wide blooms or twin or triple workpieces, it is also advantageous in this case, as shown in FIG. 2, to provide that the shearing bar 6 is divided into shearing bar portions 9 which, each being guided by two stroke-producing elements 11, are firstly raised at both sides in the shearing beam 5 and are then pressed against the bloom. When the shearing bar 6 is divided into two, the maximum upward displacement and travel movement of the stroke-producing element on one side is halved.

When taken to a further degree, that concept results in many small shearing bar portions 9 which, being particularly short, no longer permit the use of two stroke-producing elements 11 and which, with a suitable guide means, also no longer need them as the inclined positioning and curvature or different heights in relation to twin or triple workpieces, being limited to short distances in the vertical plane, have become insignificant, and the total deviation of the burr line 7 from the ideal horizontal position is compensated for by slightly different adjustments in respect of height of the individual shearing bar portions 9. In that arrangement, even if all the bar portions 9 do not remain in alignment with each other in respect of height, they do remain in alignment with each other at the front and rear edges.

An advantageous configuration according to the invention of the shearing bar 6 is for the one-piece shearing bar 6 to be divided up into a shearing bar which comprises shearing blocks 10 which are arranged in respective rows one behind the other and individually displaceable with respect to the height in the shearing beam 5 and which are supported on stroke-producing elements 11 whereby their uppermost and lowermost positions are defined in the shearing beam 5 or relative to each other. The shearing blocks 10 are of square, rectangular, polygonal or rounded cross-section such that the cross section of the blocks may be displaced as to its height, to impede rotary movement, to prevent the shearing block edges from breaking off and to ensure as far as possible that the burr 7 is broken up into individual chips or pieces when it is removed. When using a symmetrical shearing block cross-section, use at two or more sides is advantageous, in particular when the front and rear sides of the entire shearing bar 6 come into effect alternately.

In order to minimize the pressure force of the shearing blocks against the underneath surface of the casting 1 or the bloom 2, and in order thereby to minimize the horizontal shearing force required, in accordance with the invention each shearing block 10 or each group thereof is urged upwardly or downwardly by different pressures, in that the arrangement provides for individual or group control or actuation. Desirably, an automatic variation in pressure or actuation of the respective shearing blocks 10 or groups thereof is achieved by the drive or spring elements boing of a stepped design configuration. In that arrangement, those elements themselves, by virtue of their respective working position, can control or provide pilot control for the elements which subsequently come into operation, for being lifted, pressed more firmly against the bloom, or lowered.

The mode of operation, service life and cost of this burr removal system are advantageously affected by improving additions or modifications. They include for example the addition to the shearing block 10 of a high-strength shearing block cap 14 or the arrangement of control passages or ducts through which the lowered position of all shearing blocks 10 or the position of them being fully pressed against the bloom is monitored, for example by means of light barrier arrangements. On the other hand, transversely extending blowing-through passages or ducts 16 provide for constantly cleaning the apparatus of scale dust which, in spite of additional cover portions 15, penetrates into the guides of the shoaring blocks 10. Pistons 13 and cylinders 12 of the stroke-producing elements 11 are additionally protected from fouling by means of a telescopic sleeve 16.

When dealing with burrs 7 on long portions, the same burr removal machines can remove burrs from longitudinally divided blooms 2 in gaps in roller beds or, when dealing with blooms which are supported thereon in such a way as to stick out laterally, the burrs may be removed in a portion-wise manner as the blooms travel along, transversely to the longitudinal axis of the blooms. It is also possible to use any combinations of devices in side-by-side relationship or one behind the other, in a stationary position or adjustably or displaceably, for the removal of longitudinal or transverse burrs.

We claim:

1. A continuous casting device for removing a burn burr from a lower surface of a continuous casting, said device comprising:
   a shearing beam disposed beneath said continuous casting and means operable to selectively elevate said shearing beam at opposite ends thereof against said lower surface to remove said burn burr;
   at least one shearing element and means mounting said shearing element to said shearing beam in a manner which permits said shearing element to be inclined with respect to said lower surface of said casting; and
   support means and means mounting said shearing beam to said support means to permit said shearing beam to tilt about an axis perpendicular to the lower surface of said continuous casting during burr removal and in response to a contour of said burr.

2. The device as defined in claim 1, and further comprising a plurality of shearing elements and means for individually mounting said shearing elements to said shearing beam to permit the angle of inclination of each of said shearing elements to be adjusted with respect to the plane of said lower surface of said continuous casting.

3. The device as defined in claim 1, and further comprising a plurality of shearing elements, means for individually mounting said shearing elements to said shearing beam, and means for individually urging said shearing elements upwardly against said casting and downwardly by said casting.

* * * * *